United States Patent [19]

Haile

[11] Patent Number: 4,658,541

[45] Date of Patent: Apr. 21, 1987

[54] INTERLOCKING PLANTERS, FOR USE IN ERECTING DECORATIVE WALLS OR THE LIKE

[76] Inventor: Ernest Haile, 30 Cadwalader Ter., Trenton, N.J. 08618

[21] Appl. No.: 826,441

[22] Filed: Feb. 5, 1986

[51] Int. Cl.⁴ .............................................. C10J 3/22
[52] U.S. Cl. ........................................ 47/83; 52/594; 405/284
[58] Field of Search ........................ 52/594, 591, 311; 47/82, 83; 405/284, 286

[56] References Cited

U.S. PATENT DOCUMENTS

| | | | |
|---|---|---|---|
| 1,895,801 | 1/1933 | Keller | 52/591 |
| 3,073,061 | 1/1963 | Pearson | 47/83 |
| 4,355,485 | 10/1982 | Frank | 47/82 |

FOREIGN PATENT DOCUMENTS

| | | | |
|---|---|---|---|
| 12011 | 6/1980 | European Pat. Off. | 47/82 |
| 2929593 | 2/1981 | Fed. Rep. of Germany | 47/83 |
| 3040410 | 3/1982 | Fed. Rep. of Germany | 405/284 |
| 3220531 | 12/1983 | Fed. Rep. of Germany | 47/83 |
| 8100952 | 4/1981 | France | 47/83 |
| 598789 | 5/1978 | Switzerland | 47/83 |
| 2087701 | 6/1982 | United Kingdom | 47/83 |

Primary Examiner—Henry E. Raduazo
Attorney, Agent, or Firm—Sperry, Zoda & Kane

[57] ABSTRACT

Disclosed is a planter or flower pot construction, wherein approximately semicircular planters may be arranged in horizontal courses. The planters of each course are staggered in respect to those of the next lower course in a manner similar to that in which bricks or building blocks are laid up to form a building wall. The basic planter used in erecting the wall has a straight back wall and a front wall curved through approximately 180°. Alternate courses utilize end planters of quarter-circular form. The back walls of the several planters, at top and bottom, are formed with alternating teeth and notches, adapted to interlock with the teeth and notches of the next upper and lower courses. In each course, the planters have drain openings that open into the planters of the next lower course, so that when the plants are watered, excess water in each planter will drain to the next lower course to assure not only proper drainage but also maximum conservation of water. In a modified form designed particularly for plantings of the hydrophilic type, drain tubes are provided, controlling the water level in each planter. Also disclosed is a planter in which the back wall is curved, to permit the erection of walls that are wholly or partially curved.

17 Claims, 10 Drawing Figures

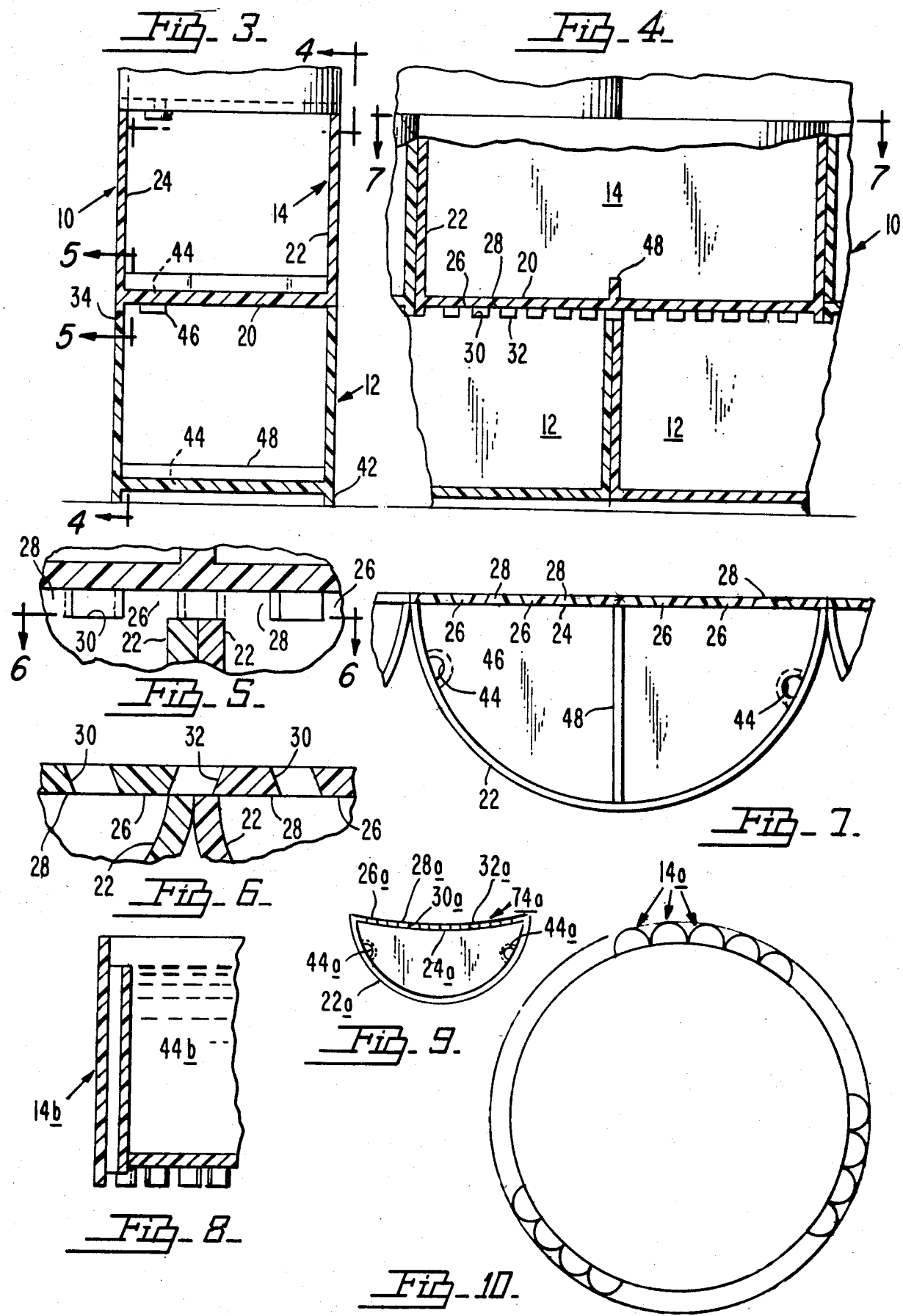

INTERLOCKING PLANTERS, FOR USE IN ERECTING DECORATIVE WALLS OR THE LIKE

BACKGROUND OF THE INVENTION

1. Field of the Invention

The present invention relates generally to planters or flower pots of the type adapted to interlock with each other when laid up in horizontal courses, to form a decorative wall or the like. In a more particular sense, the invention refers to planters of this type wherein the upper and bottom edges of the back walls have alternating teeth and notches adapted to interlock with mating notches and teeth of adjacent courses.

2. Description of the Prior Art

It has long been known to form flower pots or planters in such a way as to permit them to be laid up in courses in each of which the planters are at least partialy exposed to facilitate the planting and growth of decorative flowers or the like. In interlocking planters of this type, further, it is known to stagger the several pots or containers. A typical example is found in my U.S. Pat. No. 3,726,042 issued Apr. 10, 1973.

The prior art as it relates to planting walls or stackable planters, however, in general has suggested planters of relatively complicated design, in many instances, and in other instances has failed to provide arrangements wherein a maximum conservation of water is assured; wherein the planter can be swiftly erected without the use of special clamps, tools, mortar, fasteners, or the like; wherein drainage through the entire height and length of the wall is assured in such a way as to confine the drainage to the planting areas of the wall without possibility of discoloration or wear of exposed surfaces; wherein a very few different forms of the planters can be used to advantage to erect a wide variety of planting walls; and wherein the construction, in at least one modified arrangement, especially adapts the wall for plantings of the hydrophilic type.

The basic purpose of the present invention is to overcome these deficiencies noted in the prior art.

SUMMARY OF THE INVENTION

The present invention utilizes, basically, planters or pots which are all alike, except for the provision of end planters of half size, and also the provision of special supports for the lowermost course. The basic planter utilized in practicing the invention is a container that opens upwardly, and that is generally semicircular in form, with a curved front wall and a straight back wall. Teeth and notches formed in the upper and bottom edges of the back wall interlock with corresponding notches and teeth of the courses above and below the planter, when the planters are laid up in horizontal courses with the planters of each course staggered in respect to the planters of the courses next above and below the same. The teeth and notches are so designed as to prevent not only end-wise movement of the planters, but also relative lateral movement thereof. No adhesive bonds, grout, mortar, or the like are needed, and assembly of the planters is also achieved without the use of tools. Thus, the planter can be erected swiftly and easily, in any desired length and height.

In a second form of the invention, the back walls are slightly curved, thereby to permit walls to be erected that are completely or partially curved.

Drainage openings are provided in each planter, opening into the planter next below the same when the planters are laid up in courses in the manner described above. As a result, water entering any course, if not utilized by the plants of that course, may drain into the course next below the same, so as to assure maximum usage of water, all without the possibility of the water flowing over the front walls in a manner that would tend to discolor the walls as well as waste the water.

A form of the invention is also disclosed in which the drainage means is in the form of tubes integrally molded upon the walls, and rising to a selected level within the planter, so as to permit the planter to be used entirely as a receptacle for water, in plantings of the hydrophilic type. The tubes control the water level in each planter, and excess water automatically drains into the planters of the next lower course.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 3 is an enlarged, vertical sectional view through the wall, substantially on line 3—3 of FIG. 1;

FIG. 4 is a vertical sectional view substantially on line 4—4 of FIG. 3;

FIG. 5 is a fragmentary, still further enlarged, detailed sectional view substantially on line 5—5 of FIG. 3;

FIG. 6 is a detail, horizontal sectional view on the same scale as FIG. 5, taken substantially on line 6—6 of FIG. 5;

FIG. 7 is a horizontal sectional view on line 7—7 of FIG. 4;

FIG. 8 is a fragmentary sectional view through a modified form of planter, in which a drain tube is provided, for use in hydrophilic plantings;

FIG. 9 is a top plan view, on a reduced scale, of a modified form of planter; and FIG. 10 is a top plan view of a circular planting wall erected, utilizing the modified planter shown in FIG. 9.

DETAILED DESCRIPTION OF THE PREFERRED EMBODIMENTS

Figure 1:
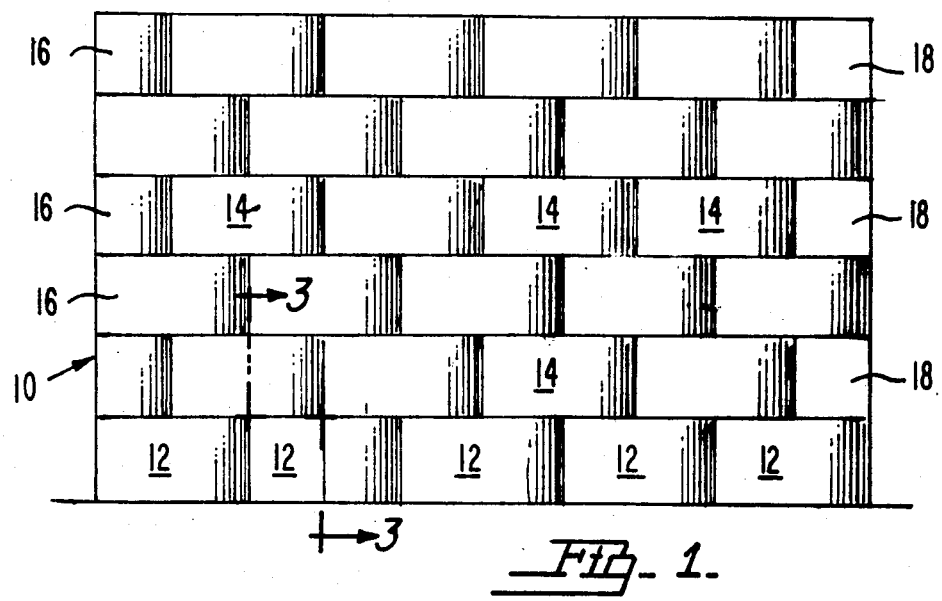
FIG. 1 is a front elevational view of a planter wall erected with planters constructed according to the present invention.
Figure 2:
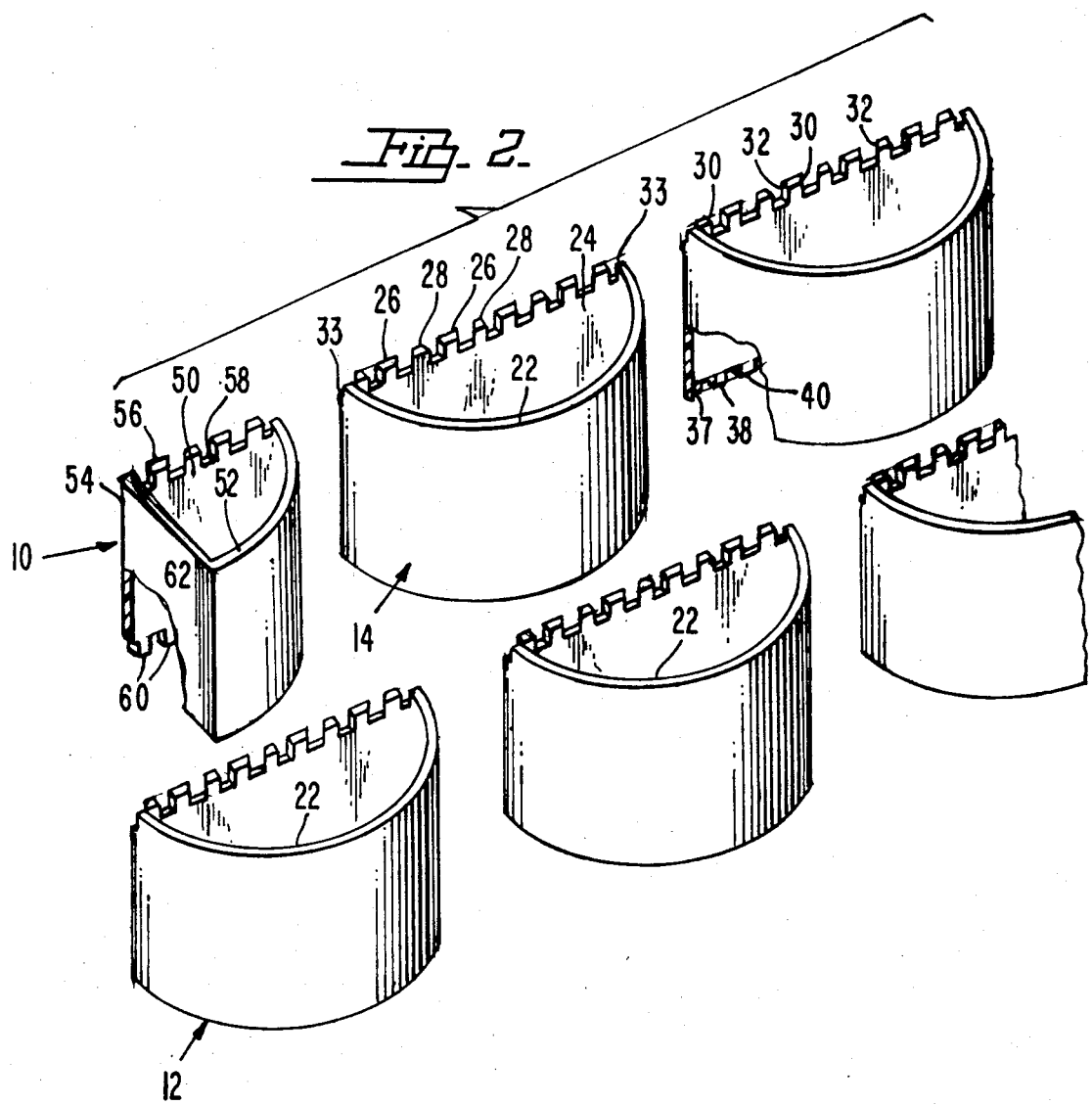
FIG. 2 is an exploded, fragmentary perspective view of a portion of the wall, on an enlarged scale.

Referring to FIG. 1, there is here shown a wall generally designated 10, which has been erected, utilizing semicircular planters 12 for the bottom course, semicircular planters 14 for the remaining courses, and left and right-hand end planters 16, 18. The planter 14 may be regarded as the basic form of planter used in erecting the planting wall 10, and includes a flat bottom wall 20, a front wall 22 curved through 180°, and a straight, vertical back wall 24. These can be molded as a single, integral container fully open at its top, from a suitable, strong plastic or any other material having the requisite characteristics of durability, resistance to the elements, and attractiveness.

Formed in the upper edge of the back wall is a series of spaced teeth. As will be noted particularly from FIG. 6, these include trapezoidal teeth 26 alternating with oppositely facing, trapezoidal teeth 28. Alternating oppositely facing teeth in this way produces upper notches which, when viewed from above, are of parallelogram shape. Upper notches 30 when viewed as in FIG. 6, have their end walls facing in one direction, and these notches alternate with upper notches 32, the end walls of which are inclined in the opposite direction. At the ends of the upper edge of back wall 24, half notches 33 are provided, adapted to communicate with the corresponding half notches of the next adjacent blocks of the same course, to form full notches similar to those shown at 30, 32 respectively.

The bottom edge of each back wall is formed with a bottom series of teeth 34 formed as parallelograms the end walls of which incline in one direction, alternating with bottom teeth 36, having the shape of parallelograms the end walls of which incline in the opposite direction. At the ends of the bottom edge, bottom teeth 37 of half size are formed, and are adapted to abut against the corresponding end bottom teeth 37 of the next adjacent planters of the same course.

The provision of the bottom teeth 34, 36 defines trapezoidal bottom notches 38 adapted to receive the teeth 26 of the next lower course, and oppositely trapezoidal notches 40 adapted to receive the upper teeth 28 of the planters of said next lower course.

The planters of the bottom course are formed with solid bottom flanges 42 formed as extensions of the front and back walls of the planters of the bottom course, and extending downwardly below the bottom walls of the planters of the lowermost course a distance similar to the projection of the bottom teeth provided upon the planters, thereby to assure a stable, horizontal base for the planters of the lowermost course. The planters 14 of all courses above the lowermost course are identical in every respect to the planters of the lowermost course, except for the omission of the solid supporting flange 42 on each planter. Instead, the bottom wall of each planter rests directly upon the curved top edges of the front walls of the planters of the next lower course, with the back walls thereof interlocked.

All the planters are formed, further, with a pair of drain holes 44 (see FIG. 7) located adjacent the ends of the curved front wall thereof. Drain holes 44 are provided, on the underside of each planter, with a protective flange 46 extending downwardly therefrom a distance less than the projection of the bottom series of teeth. Flanges or lips 46 have the desirable purpose of preventing water from flowing along the underside of each planter to the front wall, where it would drip down the front of the planter, thereby discoloring the same and additionally tending to create wear and wastage of water needed for the nutriment of the plantings.

It is also desirable to provide, in each planter, a dividing rib 48 integrally formed upon the bottom wall thereof, and adapted to bisect the bottom wall into quadrantal areas (see FIG. 7). The provision of the dividing rib equalizes the distribution of drainage water at opposite sides thereof, and assures proper drainage in the event the planters should become slightly tilted toward one or the other of its ends. With a dividing rib of this type in each planter, water at each side of the rib will run to the drainage hole at that side.

The left-hand end planters 16 are identical to but opposite from the end planters 18. Accordingly, the description of the end planters 16 will suffice for the planters 18, which are simply formed as exact opposites of the planters 16.

Each end planter 16 is half the length of a planter 12 or 14, and is of quadrantal form, with a straight back wall 50, a front wall 52 curved through 90°, and a straight, vertical side wall 54 disposed at 90° to the wall 50. Walls 50, 52, 54 are integrally molded, in a preferred embodiment, and formed on the top edge of back wall 50 is a series of upper teeth 56 corresponding to the upper teeth of the planters 12 or 14, and defining upper notches 58 corresponding to the upper notches of said planters 12 or 14. Also formed on each end planter are bottom teeth 60 corresponding to the bottom teeth 34, 36, and defining between them notches 62 corresponding to the notches 38, 40.

In laying up the wall, one simply positions the planters of the bottom-most course in an end-to-end relation, with the several back walls thereof disposed in a common vertical plane. Then, the next course is laid up first by placing a left-hand end planter 16 in interlocking relationship with the planter 12 immediately below the same. One simply moves the planters of each course downwardly, to engage the bottom teeth thereof in the upwardly opening, upper notches of the planters of the next lower course. This locks the planters against endwise movement, and also against forward or rearward movement.

Planters 14 are now laid up, end-to-end in interlocking relationship with the planters next below the same. It may be noted that the half-teeth at the bottom of each planter abut against the half-teeth of the next adjacent planters to fit into a full-sized upper notch of the planter next below the same.

In this way, a wall can be erected with a selected number of courses, and can be of any desired length. The wall can be erected against a pre-existing building wall, such as along the foundation of one's home. Or, the wall can be used as a divider on a patio, in a garden, or against a terrace wall. In each instance, the several planters can be filled to a selected level with potting soil, and planted with a selected ornamental plant or variety thereof, to produce a highly attractive and interesting visual effect.

It is not essential that the wall be completely straight. In FIG. 9, for example, there is shown, on a reduced scale, a container 14a which is of crescent shape, having a curved back wall 24a. The back wall is formed with alternating teeth and notches 26a, 28a, 30a, 32a, similar to those shown at 26, 28, 30 and 32 respectively. Back wall 24a would also be formed with a series of bottom notches and teeth similar to those provided upon containers 14. Drain holes 44a are also provided, adjacent the opposite ends of the front wall 22a.

Utilizing containers or planters such as shown at 24a, one can, for example, erect a completely circular wall as illustrated in FIG. 10. Or, alternatively, one can erect a wall that includes both curved and straight portions.

The invention also, as indicated previously, includes provisions for hydrophilic plantings, utilizing only water in the several planters. For this purpose, one uses containers having the feature shown in FIG. 9. There is here shown a container which is generally designated 14b, and which is similar in every respect to the containers previously described herein, whether they have curved or straight back walls. In this container, the only difference is to have a vertically elongated drain tube 44b rather than a drain hole 44. The tube 44b has its upper end terminating a short distance below the top edge of the container. Accordingly, as shown, water can be placed within the container, and will rise to the level of the upper end of the drain tube. Excess water accumulating within the container drains through the tube, into the container next below. Any excess created in the container next below will similarly drain through the drain tube of that container, and so forth on down and through the lowest course.

While particular embodiments of this invention have been shown in the drawings and described above, it will be apparent, that many changes may be made in the form, arrangement, and positioning of the various elements of the combination. In consideration thereof it should be understood that preferred embodiments of this invention disclosed herein are intended to be illustrative only and not intended to limit the scope of the invention.

I claim:

1. A planter wall formed of interlocking planters each of which comprises:
   (a) an open-top container for plants including a back wall, a bottom wall and a forwardly projecting front wall, said containers being adapted for assembly end-to-end in a plurality of courses; and
   (b) means on the back wall for interlocking each planter with those in the courses next above and below the same, said means of each planter comprising alternating teeth and notches adapted to interlock with mating teeth and notches of the planters above and below the same, said teeth being of trapezoidal shape.

2. A planter wall as in claim 1 wherein the back wall of each container has top and bottom edges, said teeth and notches being formed in both the top and bottom edges of each container.

3. A container as in claim 1 wherein the front wall of each container is curved through approximately 180°.

4. A planter wall as in claim 1 wherein the containers of each course are staggered relative to the containers in the courses next above and below the same.

5. A planter wall as in claim 1 wherein the containers of each course are staggered relative to the containers in the courses next above and below the same, the teeth and notches of each container being interlocked with the mating teeth and notches of at least one but no more than two of the containers of the courses next above and below the same.

6. A planter wall as in claim 5 wherein at least a portion of each container is supported upon one or more front walls of the containers of the course next below the same.

7. A planter wall as in claim 6 wherein each container includes at least one drain hole opening through the bottom wall thereof.

8. A planter wall as in claim 7 wherein each drain hole of a container is so located as to cause drainage from each container into a container of the course next below the same.

9. A planter wall as in claim 8 wherein each drain hole is so formed as to require that water gravitating to the bottom of the container will flow therethrough.

10. A planter wall as in claim 8 wherein each container is formed with a tube extending upwardly from the drain hole thereof and terminating at its upper end below the level of the open top of the container, whereby water will accumulate within the container to the level of the upper end of the tube with any excess of water draining through the tube to a container of the next lower course.

11. A planter wall as in claim 1 wherein said back walls are straight from end-to-end.

12. A planter wall as in claim 1 wherein said back walls are curved.

13. A planter wall as in claim 12 wherein said back wall of each container is curved inwardly of the container.

14. A planter wall formed of interlocking planters each of which comprises:
    (a) an open-top container for plants including a back wall, a bottom wall and a forwardly projecting front wall, said containers being adapted for assembly end-to-end in a plurality of courses; and
    (b) means on the back wall for interlocking each planter with those in the courses next above and below the same, said means of each planter comprising alternating teeth and notches adapted to interlock with mating teeth and notches of the planters above and below the same, said teeth and notches being so formed as to prevent relative lateral movement of the interlocked planters, the teeth of each planter including first trapezoidal teeth having short sides facing inwardly of the container, said second trapezoidal teeth alternating with the first teeth and facing outwardly of the container.

15. A planter wall as in claim 14 wherein the alternating first and second teeth of each container define on each container a series of first notches of parallelogram shape inclined in one direction, and a series of second notches alternating with the first notches, said second notches being of parallelogram shape and being inclined oppositely to the first notches.

16. A planter wall formed of interlocking planters each of which comprises:
    (a) a generally horizontal bottom wall, a generally vertical back wall, and a vertically disposed front wall curving forwardly from the back wall through approximately 180°, said walls being fixedly joined to each other to define an open-top container adapted to be arranged end-to-end with other containers to form a generally horizontal course thereof, said wall comprising a plurality of said courses, superimposed one upon another; and
    (b) means for interlockingly engaging the containers of each course with the containers of the courses next above and below the same,
    said back wall of each container having top and bottom edges, one of said edges being formed with a series of teeth alternating with a series of notches, the teeth of said edge comprising first, trapezoidally shaped teeth having short sides facing inwardly of the container and long sides facing outwardly thereof, the first teeth of said edge alternating with the second teeth of the same edge, the second teeth being trapezoidally shaped with short sides facing outwardly of the container and long sides facing inwardly thereof, said first and second teeth of said edge of the back wall of the container defining between them first and second notches of parallelogram shape, the first notches and second notches alternating along said one edge of the container back wall with the first notches being inclined oppositely to the second notches, the other edge of each container having teeth of parallelogram shape and notches of trapezoidal shape, the containers of each course being staggered relative to the containers of the courses next above and below the same, said containers being approximately semicircular when viewed in plan, said planter wall further including end planters of quadrantal shape, the teeth and notches of the end planters interlocking with the mating, correspondingly shaped notches and teeth of the first named containers immediately above and below the same, the several first named containers of the plurality of courses of said building wall having their teeth and notches interengaged with at least two containers of the courses next above and below the same.

17. A planter wall as in claim 16 wherein all of the containers of said wall are formed with drain openings so located as to require drainage into the containers of the next lower course.

* * * * *